No. 873,494.

PATENTED DEC. 10, 1907.

J. L. BROWN.
PIPE WRENCH.
APPLICATION FILED AUG. 1, 1907.

2 SHEETS—SHEET 1.

WITNESSES
E. M. Callaghan
Amos W. Hart

INVENTOR
JAMES L. BROWN
BY Munn & Co.
ATTORNEYS

No. 873,494.

PATENTED DEC. 10, 1907.

J. L. BROWN.
PIPE WRENCH.
APPLICATION FILED AUG. 1, 1907.

2 SHEETS—SHEET 2.

WITNESSES

INVENTOR
JAMES L. BROWN.
BY
ATTORNEYS.

UNITED STATES PATENT OFFICE.

JAMES L. BROWN, OF BROOKVILLE, PENNSYLVANIA.

PIPE-WRENCH.

No. 873,494.   Specification of Letters Patent.   Patented Dec. 10, 1907.

Application filed August 1, 1907. Serial No. 386,635.

*To all whom it may concern:*

Be it known that I, JAMES L. BROWN, a citizen of the United States, and a resident of Brookville, in the county of Jefferson and State of Pennsylvania, have invented an Improved Pipe-Wrench, of which the following is a specification.

My invention is an improvement in that class of pipe wrenches in which a chain is employed as the gripping member, the same being pivotally connected with the end of a lever and the latter provided with means for locking the free end of the chain after being passed around the pipe or other object.

Figure 1:
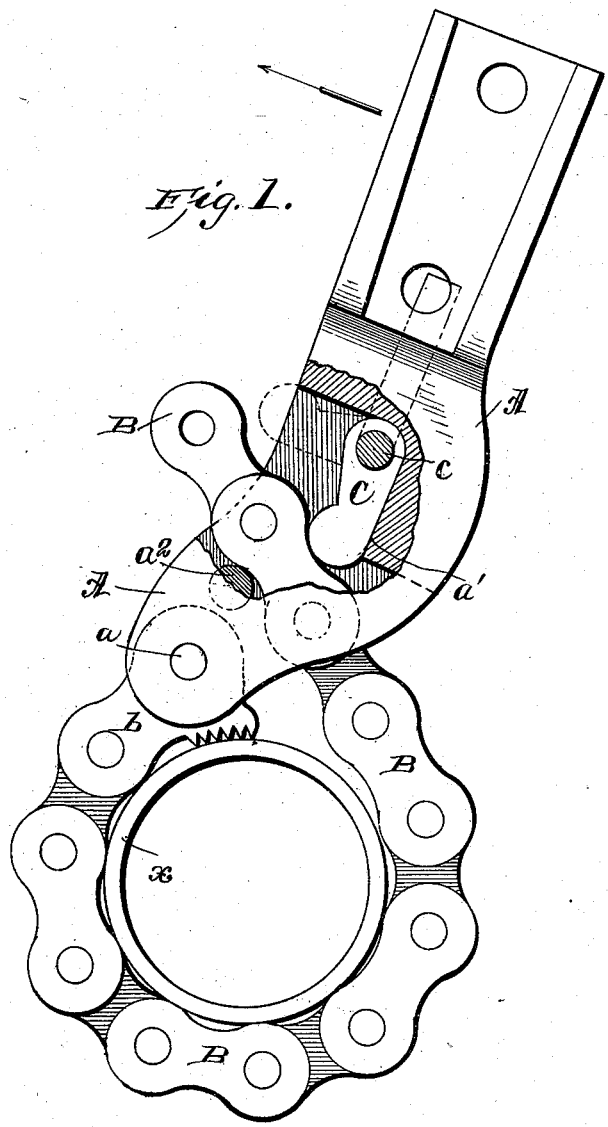
Figure 2:
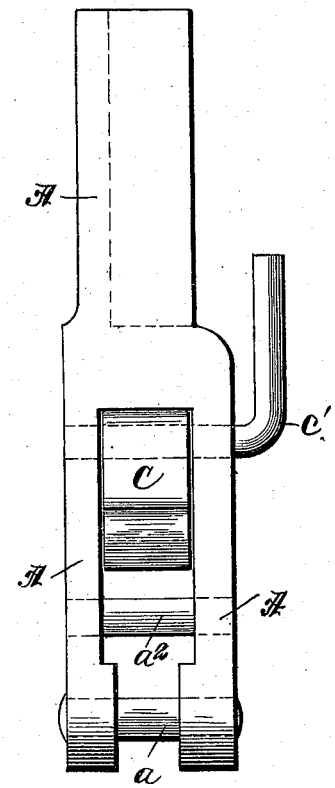
Figure 3:
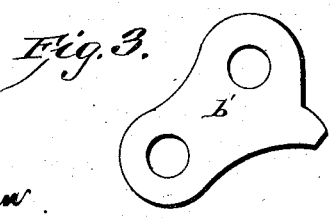
Figure 4:
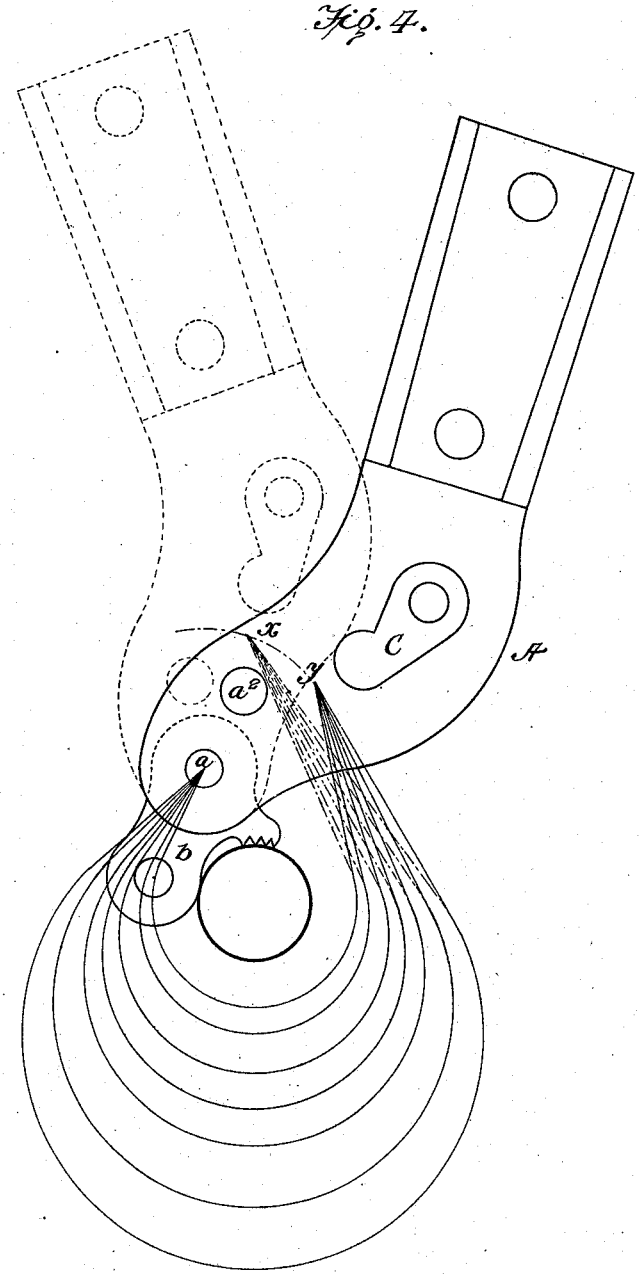

The details of construction, arrangement, and operation of my improved wrench are as hereinafter described, and illustrated in the accompanying drawing, in which Figure 1 is mainly a side view of my improved wrench, a portion being broken away to show the interior construction. Fig. 2 is a rear elevation of the body of the wrench, without the chain. Fig. 3 is a side view of a modified form of link forming part of the chain. Fig. 4 is a diagrammatic view illustrating the operation of the wrench.

The lever head A is forked and its shank is suitably constructed for attachment of a wooden or metal bar (not shown). The chain is composed of a series of links, and pivotally attached to the nose or extremity of the forked head as indicated at $a$. The link $b$ is shown provided with teeth for engaging the pipe X or other part which is to be rotated.

In Fig. 3 I illustrate a form of link $b'$ which is unprovided with teeth. The upper portion of the fork A is provided with an abutment $a'$, and a dog C is pivoted to the head by means of the pin $c$. The free end of the dog is rounded and adapted to engage the concave portion of a chain link. A transverse pin $a^2$ passes through the fork at a point adjacent to the chain pivot $a$ it being located between said pivot and the free end of the dog C, and on a slightly convex line joining such contact point and the pivot $a$. The space in the head A at the right of the pin $a^2$, is free or clear, so the chain B may shift therein as the wrench is applied to pipes of different diameters, and, when applied to a pipe of very small size, the chain may draw close to the biting link $b$.

When the dog C is in locking position, as shown by full lines Fig. 1, its rear side rests against the abutment $a'$ and the distance between its rounded end and the pin $a^2$ being less than the diameter of the end of the chain link, the chain is secured as required in use. The pin $c$ is provided with a lateral upturned extension $c'$, see Fig. 2, the part $c'$ thus constituting a handle by which the dog may be adjusted in the two positions illustrated by full and dotted lines Fig. 1. That is to say, when it is required to release the chain, the lever is thrown backward a little and the chain B is drawn through the forked head far enough to allow the dog to be swung outward and upward into position shown by dotted lines, Fig. 1, thus leaving ample space for withdrawal of the chain from the forked head. It will be seen that the inner end of the dog C is rounded and that it abuts a correspondingly rounded portion at an angle of the abutment $a'$, whereby the pivot C is greatly relieved of strain when the wrench is in use. It will be seen that the center line of the pulling strain is midway between the points $a$—$c$ and that a line drawn through the center of the pipe X will pass through the center of the space, as indicated. This relation of the center line of the pipe to the center line of pulling strain is an important feature in the construction and practical operation of the wrench in respect to the leverage obtained.

In further explanation of the operation, it may be stated that the moment a pull is applied to the handle A the pivotal link $b$ (or $b'$) impinges on the pipe, and there can be no slip because the nose of link $b$ (or $b'$) projects beyond the outer line of pipe so that it has a positive friction or bite the greater the pulling strain. This projection of the nose of link is farther from pivot $a$ than the latter is from the bearing pin $a^2$. Fig. 4 illustrates the operation of the wrench by full and dotted lines, as applied to pipes of different diameters. The line of strain on the chain and the center of the latter, shifts along the curved line indicated by $x$ and $y$.

I claim—

1. The improved pipe wrench comprising the forked lever head having a solid abutment $a'$, a dog pivoted adjacent to said abutment and adapted for contact therewith when in locking engagement, a chain pivotally attached to the nose of the forked head and adapted to pass through the space between the forks, and a pin $a^2$ arranged above the chain pivot, the distance between the said pin and the free end of the dog when the latter is in locking position being less than the diameter of the ends of the chain link, as shown and described.

2. The combination with a chain and a forked lever head having interior abutments $a'$, $a^2$, the distance between them being greater than the thickness of the chain links, and a locking dog pivoted adjacent to the abutment $a'$ and adapted when in locking position to rest against the latter in the manner described.

3. The combination with the forked lever head having abutments $a'$ and $a^2$ and a chain pivotally attached to the nose of said head, of a dog pivoted at the inner angle of the abutment, its pivotal end being rounded and the adjacent portion of the abutment being correspondingly curved whereby the dog when in locking position rests against said abutment, and its pivotal end in contact with the curved portion of the latter, substantially as described.

4. The improved chain pipe wrench comprising a chain and a forked lever head pivotally connected, fixed abutments $a'$ and $a^2$ arranged in said head and a dog pivoted adjacent to one of the abutments, the center of the space in said head which is available for the chain being coincident with the central line of the pulling strain and a line passing diametrically through the pipe to which the wrench may be applied, as shown and described.

5. A chain pipe-wrench, comprising a forked lever head, a chain and a biting link $b$ that pivotally connects it with said head, the lever head having a locking device and a transverse bearing pin $a^2$, the space in the forked head at the right of said pin being free to permit shifting the chain toward and from the pivot $a$ when applied to objects of different diameters, the center line of strain on the chain remaining between the center of pin $a^2$ and the contact end of the locking device, as shown and described.

JAMES L. BROWN.

Witnesses:
JOHN M. WHITE,
JOHN J. NYLAND.